United States Patent [19]

Shimp

[11] 4,417,010

[45] Nov. 22, 1983

[54] POLYOL/IMIDAZOLE CURING AGENTS FOR EPOXY RESINS

[75] Inventor: David A. Shimp, Prospect, Ky.

[73] Assignee: Celanese Corporation, New York, N.Y.

[21] Appl. No.: 462,834

[22] Filed: Feb. 2, 1983

Related U.S. Application Data

[63] Continuation-in-part of Ser. No. 346,666, Feb. 8, 1982, abandoned.

[51] Int. Cl.³ .................. C08G 59/62; C08G 59/68
[52] U.S. Cl. .................................... 523/466; 252/182;
525/504; 525/507; 528/94; 528/99; 528/110;
528/111; 528/117; 528/336; 528/361; 528/367;
528/406
[58] Field of Search .................. 523/466; 528/94, 99,
528/110, 111, 117, 336, 341, 361, 367, 406;
252/182; 525/504, 507

[56] References Cited

U.S. PATENT DOCUMENTS

| 3,493,630 | 2/1970 | Salensky | 260/831 |
| 3,523,032 | 8/1970 | Kujas | 117/47 |
| 3,634,323 | 1/1972 | Moran, Jr. | 260/47 EP |
| 3,635,894 | 1/1972 | Dowbenko et al. | 260/47 |
| 3,923,571 | 12/1975 | Aoki et al. | 156/94 |
| 3,931,109 | 1/1976 | Martin | 260/47 EP |
| 3,965,211 | 6/1976 | Harris et al. | 260/830 R |
| 3,989,673 | 11/1976 | Jenkins et al. | 260/47 EN |
| 4,060,655 | 11/1977 | Johannes et al. | 428/35 |
| 4,066,625 | 1/1978 | Bolger | 260/59 R |
| 4,069,203 | 1/1978 | Carey et al. | 260/47 EC |
| 4,159,976 | 7/1979 | Moran, Jr. | 260/33.4 EP |
| 4,343,843 | 8/1982 | Johnson et al. | 528/101 |

Primary Examiner—Earl A. Nielsen
Attorney, Agent, or Firm—Herbert P. Price

[57] ABSTRACT

A liquid curing agent for polyepoxides having terminal epoxide groups is made from a blend of a normally solid aliphatic polyol and a monoimidazole. Cured compositions made from the curing agent and the polyepoxide are useful in various types of plastics applications.

11 Claims, No Drawings

POLYOL/IMIDAZOLE CURING AGENTS FOR EPOXY RESINS

CROSS REFERENCE TO RELATED APPLICATIONS

This is a continuation-in-part of Ser. No. 346,666 filed Feb. 8, 1982 abandoned.

BACKGROUND OF THE INVENTION

The field of art to which this invention pertains is curable compositions based upon mixtures of polyepoxide resins and imidazole type curing agents. More particularly, this invention relates to liquid blends of monoimidazole curing agents and normally solid polyols used to cure liquid polyepoxides.

For many years in the epoxy plastics industry, attempts have been made to insure that two-component compositions possess a long pot life and at the same time a short cure time. In other words, it is particularly desirable that the cure response of the combined epoxide resin/curing agent mixture is such that it may be used for several hours at working temperatures without an inordinate increase in viscosity. It is also important that the polyepoxide compositions exhibit a short cure time, so that long, expensive cure schedules at elevated temperatures are not required. This combination of long pot life and short cure schedule is particularly necessary in various plastics end uses, including forming auto springs, filament wound pipe and tanks, and other fiber reinforced components. To date, no one resin system has exhibited the desired ratios of pot life and cure time.

In addition to this desired combination of cure properties, general use plastic compositions should be non-staining, of low toxicity, and in the cured state possess a high degree of chemical resistance. It is also necessary that these compositions maintain physical strength at elevated service temperatures and exhibit toughness at normal ambient temperatures.

In the prior art, solubility problems have made it extremely difficult to utilize normally solid, aliphatic polyols, particularly in 100% solids curing applications. Usually normally-solid polyols were incorporated into prior art epoxy-based compositions through the use of a solvent. However, when solvents are employed, increases in cure temperatures and times are required in order to drive the solvent off from the curing composition. In addition, as the solvent is removed during curing, voids can develop. On the other hand, previously available liquid polyols, such as ethylene glycol and glycerine, exhibit poor compatibility with most liquid epoxy systems.

In the prior art the use of imidazole type curing agents has been found to be particularly desirable where a combination of long pot life and short cure time is required. However, the incorporation of solid imidazole curing agents into epoxide compositions has been particularly difficult because of their high reactivity with heated resin. Thus, like the polyol systems in the prior art, in order to incorporate solid imidazole catalysts, it has been necessary to employ a solvent. As a result, higher curing temperatures and longer curing times have been required in order to drive the solvent off from the finally cured system. And like other prior art solvent systems, voids can develop during curing.

An alternative method of utilizing imidazole catalysts has been to dissolve them in the liquid epoxy resin at elevated temperatures. However, this procedure has resulted in greatly decreased pot lives and working times for these high temperature solubilized systems.

It is an object of this invention, therefore, to prepare liquid, non-staining, low toxicity curing agents for polyepoxides which, when blended with polyepoxides, form curable systems which exhibit increased pot lives and, at the same time, relatively short, low-temperature cure schedules.

In addition, it is an object of this invention to prepare thermoset plastic compositions with improved chemical resistance. Another object is to prepare thermoset plastic compositions which exhibit a combination of elevated temperature strength and ultimate tensile strain capability at room temperature unequalled by unmodified, catalytically cured epoxy resin plastics.

These and other objectives are obtained by preparing the compositions of the instant invention.

SUMMARY OF THE INVENTION

This invention involves three important discoveries. The first is that by utilizing either of N,N'-dihydroxyethyl 5,5'-dimethyl hydantoin or trimethylpentanediol, in combination with a normally solid, eutectic-forming imidazole, a liquid curing agent is obtained which is useful in preparing thermoset epoxy plastic compositions having improved properties.

Secondly, it has been discovered that liquid imidazoles in which the above-described solid polyols are soluble may also be used to prepare thermoset plastics compositions having improved properties.

Finally, imidazoles are effective catalysts for promoting the addition of epoxides to aliphatic hydroxyls. The incorporation of small but well defined amounts of polyols into the catalytically cured, thermoset, epoxy resin matrix effectively reduces curing stresses in the cross-linked plastic, resulting in an improved combination of heat distortion temperature and tensile strain at ambient temperatures.

The key to this invention is that either by solubilization of the polyols in the liquid imidazole or through the formation of a liquid eutectic between the imidazole and the polyol, liquid curing agents are prepared which, when reacted with epoxy resins, form compositions which exhibit improved plastic properties.

DESCRIPTION OF THE INVENTION

The polyepoxides useful in this invention are liquid in nature and must be soluble in the polyol/imidazole blend. By liquid in nature, it is meant that the polyepoxides must have a maximum viscosity of about 50,000 cps at room or ambient temperatures (25° C.). Preferably, the polyepoxide should have a maximum viscosity of about 10,000 cps at ambient temperatures. In addition, the polyepoxides must be based upon an aromatic polyol, polycarboxylic acid or aromatic polyamine. Finally, the polyepoxide material must contain terminal epoxide groups of the 1,2 or vicinal type.

Among the aromatic, phenolic polyepoxides useful in this invention are glycidyl polyethers of polyhydric phenols containing more than one 1,2-epoxide group per molecule. Such polyepoxide resins are generally derived from a polyhydric phenol and an epihalohydrin and have epoxide equivalent weights of about 110 to 400. Examples of the epihalohydrin are epichlorohydrin, epibromohydrin, epiiodohydrin, with epichlorohydrin being preferred. The polyhydric phenols are exemplified by resorcinol, hydroquinone, p,p-dihydroxyphenyl propane (or Bisphenol A as it is commonly called), p,p-dihydroxybenzophenone, p,p'-dihydroxydiphenyl, p,p-dihydroxydiphenyl ethane, bis(2-hydroxynaphthyl) methane, 1,5-dihydroxynaphthalene, phenolic novolacs and the like. Also included with the polyhydric phenols is hydrogenated Bisphenol A. These polyepoxide resins are well known in the art. Preferably the polyepoxide resins are made by reacting the epihalohydrin in an amount at least equal to the phenolic hydrogens, and most preferably in excess. The preferred polyepoxide resins are the glycidyl polyethers of Bisphenol A, having an epoxide equivalent weight of about 170 to 200.

A second type of polyepoxide which is useful in the instant invention is a glycidyl polyester prepared by reacting an epihalohydrin, such as epichlorohydrin, with an aromatic or aromatic-based polycarboxylic acid, such as, for example, one of the phthalic or phthalic-based acids and then dehydrohalogenating under reduced temperatures. The preparation of polyglycidyl esters is further described in U.S. Pat. No. 3,859,314, which is incorporated herein by reference.

A third type of polyepoxide compound is the so-called amino polyepoxide prepared by reacting an aromatic polyamine, wherein the amine group is attached directly to the aromatic ring, with an epihalohydrin and then dehydrohalogenating using an added alkali compound, such as a caustic solution. Examples of the aromatic polyamines include aniline, o-, m-, and p-toluidine and methylenedianiline. The preparation of these materials is further described in U.S. Pat. No. 3,310,528, which is incorporated herein by reference. Polyepoxides made from aminophenols are also useful in this invention.

Regardless of which type of polyepoxide is chosen, it is essential that the final product contain less than about 0.5% by weight of hydrolyzable chlorine. Hydrolyzable chlorine is defined as that amount of chlorine which may be removed by alkaline catalyzed hydrolysis. If greater than this amount of hydrolyzable chlorine is present, the imidazole in the epoxide curing mixture may become salted with hydrochloric acid and lose its reactivity.

Two essential polyols are included within the scope of this invention. Both are methyl branched diols which are normally solid at room temperature and soluble in epoxy resins, particularly those derived from Bisphenol A. The first is N,N'-dihydroxyethyl 5,5-dimethyl hydantoin. It is available from Glyco Chemicals, Inc. by the trade name of Dantocol DHE and is represented by the formala:

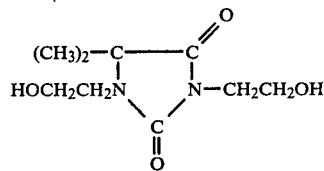

The second solid polyol which is useful in the instant invention is trimethylpentanediol, and has the formula:

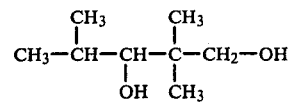

The third essential component of the instant invention is either a liquid monoimidazole, such as 1-methylimidazole, which has the formula:

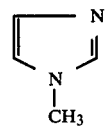

and has a melting point of −2° C., or a solid form unsubstituted imidazole or substituted imidazole which forms a liquid eutectic with either of the polyols identified above. Other preferred imidazoles include 2-methylimidazole, 2-ethyl-4-methylimidazole, and 2-phenylimidazole.

As used herein the term "liquid eutectic" means a blend of normally solid compositions, each individually melting above 25° C., which is pourable and handleable as a liquid at 25° C. due to depression of the molecularly blended material freezing point below 25° C.

In preparing the cured composition of this invention, several different types of imidazoles and polyepoxides can be utilized in the same system. However, the ratio of the ingredients useful in this instant invention are limited. About 0.05 to about 0.4 active hydrogen equivalents (active hydrogens are defined as the hydrogen atoms on the hydroxyl groups of the polyols and the hydrogen atoms on the nitrogen atom of imidazoles) in the curing agent are mixed with each epoxide group in the polyepoxide. Preferably, the mixture contains about 0.1 to about 0.2 active hydrogen equivalents per epoxide equivalent. The monoimidazole regardless of whether it contains an active hydrogen or not is used in the weight range of about 0.5 to about 5 percent based on the total weight of polyepoxide, polyol and imidazole. Preferably, the monoimidazole is used in the 1 to 3 weight percent range. Generally, the curing agent blend will contain the imidazole and polyol in the weight ratio of about 1:1 to about 1:5.

In addition to the above active components, the compositions of this invention may be modified with minor amounts of other active hydrogen containing reactants, including other polyols as well as substituted ureas, polyphenols, polycarboxylic acids, water and the like. Examples of the other polyols which are useful as modifiers in conjunction with one or more of the essential polyols described above include solid form-neopentyl glycol, trimethylolpropane, bis(hydroxyethyl) terephthalate, tris(hydroxyethyl) cyanurate and 1,4 dimethylol cyclohexane, liquid form—1,4 butanediol and glycerin. Also, the curable compositions of this invention may be modified with conventional pigments, reinforcing agents, fibers, fillers and other materials well known in the art. Fiberglass, quartz, and other siliceous materials constitute a particularly useful class of reinforcing fibers and mineral fillers for modification of the neat resin-curing agent compositions described herein.

In the practice of this invention, the polyhydroxy material and the imidazole are premixed to form a liquid material, either via the eutectic route, in which case the imidazole and the polyol are both solid but form a liquid eutectic upon mixing, or by dissolving the solid polyol in the liquid substituted imidazole to form a liquid mixture. Either of these blends then is mixed with the liquid polyepoxide using standard techniques.

The resulting curable composition has an extended pot life—at room temperature as long as eight hours—and may even be used at elevated temperatures. For example, the mixed compositions of this invention may be used at a pot temperature of 100° F., with a working life of as much as four hours. In addition, the materials of the instant invention exhibit improved heat distortion temperatures, particularly if blended with siliceous or alumina type fillers and reinforcements. The term siliceous filler and reinforcement includes silicas, silicates and silicon containing glasses in the form of particulate minerals and fibers.

The polyol/imidazole curing agents of the invention also exhibit outstanding reactivity at elevated curing temperatures, which is intermediate between amine cured epoxy systems and anhydride cured epoxide systems. The chemical resistance, thermal stability and physical strength properties of the cured compositions are excellent. The impact strength of these materials is comparable to other cured epoxides and is superior to vinyl ester systems.

The compositions of the instant invention may be used in casting, molding, filament winding, pultrusion and virtually any type of plastic end use application where a relatively long pot life and relatively high curing reactivity is desired. As previously pointed out, the cured compositions of the instant invention find particular utility when used in chemically resistant pipes and fittings, as cast tools, molds, bench tops, fiber reinforcing composites, automobile suspension springs, filament windings and the like.

The following examples will describe the invention in more detail. Parts and percentages are by weight, unless otherwise specified. The components used hereafter are more specifically described.

| COMPONENT | PROPERTIES | COMMENTS |
|---|---|---|
| Imidazole | Melting point 88°–90° C. | |
| 1-methylimidazole | Melting point −1°–−2° C. | |
| 2-methylimidazole | Melting point 136°–138° C. | |
| 2-phenylimidazole | Melting point 145° C. | |
| N—vinylimidazole | Liquid at RT | |
| N—allylimidazole | Liquid at RT | |
| Benzimidazole | Melting point 172°–174° C. | |
| Epi-Rez 509 | Viscosity at 77° C. 7,000–9,000 cps, weight per epoxide 178–193 | Available from Celanese Specialty Resins Company |

| COMPONENT | PROPERTIES | COMMENTS |
|---|---|---|
| Dantocol DHE | Melting point 62°–65° C. | Available from Glyco Chemicals, Inc. |
| Trimethylpentane-diol | Melting range 46°–55° C. | Available from Eastman Chemical Products, Inc. |
| Trimethylol-propane | Melting range 57°–59° C. | Available from Celanese Chemical Company |

EXAMPLE 1

In order to demonstrate the superior properties of the compositions of the instant invention, blends of 80% Dantocol DHE polyol and 20% of the imidazole set forth in the following table were prepared by stirring and heating to form where necessary a liquid eutectic.

| Curing Agent Composition and Properties | | | |
|---|---|---|---|
| Imidazole | Blending Temp. | Gardner-Holdt Viscosity @ RT | Crystal Formation 1 Week @ RT |
| A None (Control) | | $Z_4$–$Z_5$* | None* |
| B Unsubstituted | 60° C. | $Z_3$–$Z_4$ | None |
| C N—Vinyl | 25° C. | X–Y | None |
| D N—Methyl | 25° C. | X–Y | None |
| E N—Allyl | 25° C. | X | None |
| F 2-Phenyl | 75° C. | $Z_7$ | None |
| G 2-Ethyl-4-Methyl | 25° C. | $Z_2$ | None |
| H 2-Methyl | 80° C. | $Z_5$ | None |
| I Benzimidazole | 85° C. | >$Z_7$ | Partial |

*Dantocol DHE in supercooled liquid state.

Properties of Epoxy Resin/Curing Agent Blends 7 parts of the above curing agent material were then blended with 93 parts of Epi-Rez 509, and ⅛″ thick castings were gelled at 250° F. and cured for 1 hour at 350° F., with the following results:

| | Gel Time @ | | | Cured Casting | |
|---|---|---|---|---|---|
| | RT | 250° F.* | 302° F.* | Appearance | Tg (°C.) |
| A | | Non-Reactive | | Does not gel in 1 hr. @ 350° F. | No Test |
| B | 1–2 days | 4 min. | <1 min. | Opaque, brown | 131 |
| C | 6 days | >30 min. | >30 min. | Very soft | No Test |
| D | 1–2 days | 5 min. | 2 min. | Opaque, brown | 135 |
| E | 2–3 days | >30 min. | >30 min. | Very soft | No Test |
| F | 3–6 days | >5 min. <20 min. | 10 min. | Translucent, amber | 78 |
| G | 3–6 days | >5 min. <20 min. | 10 min. | Translucent, amber | 82 |
| H | 1–2 days | 5 min. | <1 min. | Sl. translucent, brown | 116 |
| I | >6 days | >30 min. | >30 min. | Does not gel in 1 hr. @ 350° F. | No Test |

*Stroke gel conducted on a few drops of the mixed system placed on a metal cure plate maintained at the temperature indicated.

As can be seen from the above table, only imidazole, N-methylimidazole, 2-phenylimidazole, 2-ethyl-4-methylimidazole and 2-methylimidazole provide products having a satisfactory cure response. Other similar materials do not react as desired.

EXAMPLE 2

A blend was prepared of 16.2 parts of Dantocol DHE and 4.8 parts of unsubstituted imidazole. The resulting material exhibited a Gardner-Holdt viscosity of $Z_4$–$Z_5$. 10.5 parts of this material were blended with 139.5 parts of Epi-Rez 509. At 250° F. the material in a ⅛″ thick casting gelled within 5 minutes. It was then cured for 1 hour at 350° F., producing an opaque casting which exhibited a heat distortion temperature of 142° C., a tensile strength of 7000 psi, a tensile elongation of 2.5%, and a tensile modulus of $0.36 \times 10^6$ psi.

EXAMPLE 3

A. Using the cure schedule set forth in Example 1, castings were prepared using 147 parts of Epi-Rez 509 and 3 parts of 2-ethyl-4-methylimidazole.

B. A second example was prepared by mixing 180 parts of Epi-Rez 509 with 16 parts of trimethylpentanediol and 4 parts of 2-ethyl-4-methylimidazole and curing using the cure schedule of Example 1.

C. A third example contained 180 parts of Epi-Rez 509, 16 parts of Dantocol DHE and 4 parts of 2-ethyl-4-methylimidazole. The blend was gelled at 250° F. and cured 1 hour at 350° F., with the following results:

|  | Heat Distortion Temperature | Tensile Strength | Tensile Elongation |
| --- | --- | --- | --- |
| 3-A | 104° C. | 8800 psi | 2.2% |
| 3-B | 110° C. | 8100 psi | 3.3% |
| 3-C | 136° C. | 7400 psi | 3.2% |

As can be seen, castings prepared not employing both the polyol and the imidazole (e.g., Example 3-A), are deficient in heat distortion properties and tensile properties when compared to the combined systems of the present invention (e.g., Example 3-B and 3-C).

EXAMPLE 4

A. 20 parts of Dantocol DHE were blended with 6.7 parts of trimethylolpropane and 6.7 parts of 1-methylimidazole. The resulting liquid was clear and had a Gardner-Holdt 25° C. viscosity of W-X.

B. In a second blend 20 parts of Dantocol DHE were mixed with 6.7 parts of neopentylglycol and 6.7 parts of 1-methylimidazole. The resulting blend exhibited a Gardner-Holdt 25° C. viscosity of T and was clear after one month at room temperature.

C. 186 parts of Epi-Rez 509 were then blended with 14 parts of 4-A, gelled for two minutes at 250° F. and cured for one hour at 350° F. The resulting casting was opaque and exhibited a heat distortion temperature of 143° C., a tensile strength of 5700 psi, a tensile elongation of 2.0% and a tensile modulus of $0.34 \times 10^6$ psi.

D. In a similar fashion, 186 parts of Epi-Rez 509 were blended with 14 parts of 4-B, gelled for 2 minutes at 250° F. and cured for one hour at 350° F. The resulting casting prepared using a lined mold exhibited a heat distortion temperature of 133° C., a tensile strength of 7460 psi, a tensile elongation of 2.9%, and a tensile modulus of $0.37 \times 10^6$ psi.

EXAMPLE 5

24 parts of Dantocol DHE were blended with 6 parts of 1-methylimidazole, resulting in a blend having a Gardner-Holdt 25° C. viscosity of X-Y. The blend contained some crystals after one week at room temperature. 10.5 parts of this blend were mixed with 139.5 parts of Epi-Rez 509. It gelled after 9 minutes at 250° F. and was cured for one hour at 350° F., resulting in an opaque casting having a heat distortion temperature of 139° C., a tensile strength of 7109 psi, a tensile elongation of 3.0%, and a tensile modulus of $0.31 \times 10^6$ psi.

EXAMPLE 6

In order to demonstrate the unexpectedly superior property of incorporating silica type materials into the compositions of this invention, 100 parts of Epi-Rez 509 were mixed with 125 parts of Super White silica mineral flour and 7 parts of the Dantocol DHE/1-methylimidazole blend prepared in Example 5. This material was gelled at 250° F. and then cured for 1 hour at 350° F. The casting was cut in half and one-half was postcured for 30 minutes at 400° F. The portion of the casting cured only at 350° F. exhibited a heat distortion temperature of 162° C. compared to 139° C. for the casting prepared in Example 5 containing no silica filler. Postcuring the silica filled casting at 400° F. did not increase the heat distortion temperature (158° F.)

EXAMPLE 7

Several curing agents were prepared and then mixed with epoxy resins to illustrate the effect of curing agent composition on pot life characteristics.

A. 7 parts of a blend comprising 60% Dantocol DHE, 20% trimethylolpropane, and 20% 1-methylimidazole were blended with 93 parts of Epi-Rez 509. The initial Brookfield viscosity of the system at 77° F. was 8260 cps. At 7 hours the viscosity was 12,000 cps. At 22 hours the viscosity was 109,000 cps. Pot life characteristics were also evaluated at 100° F. After 2 hours the viscosity was 2480 cps, while after 7 hours the viscosity was 13,800 cps.

B. 10 parts of a blend comprising 80% trimethylpentanediol and 20% 2-ethyl-4-methylimidazole were mixed with 90 parts of Epi-Rez 509. After 1 hour at 77° F. the viscosity was 3750 cps. At 22 hours the viscosity was 8200 cps.

C. A conventional system was prepared by mixing 18.4 parts of a blend containing 60% Tonox, an aniline formaldehyde polyamine curing agent manufactured by Naugatuck Division of UniRoyal, Inc., and 40% m-phenylene diamine with 81.6 parts of Epi-Rez 509. The initial blend exhibited a Brookfield viscosity of 8200 cps. After 7 hours at 77° F., the viscosity was 18,700 cps. After 22 hours, the material was solid. After 1 hour at 100° F., the Brookfield viscosity of the blend was 2640 cps. After 5 hours at 100° F., it had risen to 15,400 cps, and after 7 hours, the viscosity was 105,000 cps.

As can be seen from the above results, Examples 7-A and 7-B, the examples of the instant invention, provide superior long-term pot life when compared to conventional prior art systems.

EXAMPLE 8

A blend prepared from 60 parts of Dantocol DHE, 20 parts of trimethylolpropane and 20 parts of unsubstituted imidazole formed a clear, pale, yellow liquid which had a Gardner-Holdt viscosity of $Z_1-Z_2$. Castings were prepared by mixing the amount of Epi-Rez 509 indicated below. The castings were gelled at 250° F. and cured for 1 hour at 350° F.

A. 10 parts of the above curing agent were blended with 90 parts of Epi-Rez 509 to produce a polyol OH-/epoxide ratio of 0.20 and a polyol OH+imidazole NH/epoxide ratio of 0.26. The material gelled after 3 minutes at 250° F. A cured casting prepared from this material was opaque and exhibited a heat distortion temperature of 111° C., a tensile strength of 9910 psi, a tensile elongation of 6.3%, and a tensile modulus of $0.34 \times 10^6$ psi.

B. 7 parts of the above curing agent were blended with 93 parts of Epi-Rez 509 to produce a material having a polyol OH/epoxide ratio of 0.14 and a polyol OH+imidazole NH/epoxide ratio of 0.18. The material gelled after 5 minutes at 250° F. A cured casting prepared from this material was opaque, exhibited a heat distortion temperature of 139° C., a tensile strength of 7714 psi, a tensile elongation of 3.0, and a tensile modulus of $0.37 \times 10^6$ psi.

EXAMPLE 9

Using $\frac{1}{8}'' \times \frac{1}{2}'' \times 5''$ plastic bars prepared based on the polyol/imidazole curing agent formulation described in Example 2 (9-A), and the aromatic amine curing agent blend described in Example 7(C) (9-B), an evaluation of the chemical resistance properties of the two systems was carried out. In this evaluation, the plastic bars were immersed in an acid, a base, and a strong solvent, at various temperatures for a period of 480 hours, with the following results:

|  | 9-A | 9-B |
| --- | --- | --- |
| % weight gain after 480 hours immersion in: |  |  |
| 10% $H_2SO_4$ (aqueous) at 200° F. | 2.2% | 4.2% |
| 20% NaOH (aqueous) at 200° F. | 1.6% | 1.8% |
| Methylethylketone at 77° F. | 0.2% | 1.6% |

In carrying out the above tests, no dulling, etching, cracking or blistering effects were observed, which indicated that the percent weight gain was proportional to the amount of chemical absorbed by the plastic. As can be seen, the cured compositions of the instant invention exhibit clearly superior chemical resistance properties compared to prior art compositions based upon aromatic amines.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A curing agent for polyepoxides comprising a liquid blend of a monoimidazole compound and an aliphatic polyol selected from the group consisting of N,N'-dihydroxyethyl 5,5-dimethyl hydantoin and trimethylpentanediol.

2. The curing agent of claim 1 which is a liquid eutectic.

3. The curing agent of claim 1 wherein the monoimidazole compound is selected from the group consisting of unsubstituted imidazole, 1-methylimidazole, 2-methylimidazole, 2-ethyl-4-methylimidazole and 2-phenylimidazole.

4. A curable polyepoxide composition comprising a compatible mixture of a polyepoxide and a liquid blend of a monoimidazole compound and an aliphatic polyol selected from the group consisting of N,N'-dihydroxyethyl 5,5-dimethyl hydantoin and trimethylpentanediol.

5. The composition of claim 4 wherein the polyol/imidazole blend is a liquid eutectic.

6. The composition of claim 4 wherein the polyepoxide is a polyglycidyl ether of p,p'-dihydroxydiphenylpropane and the imidazole is selected from the group consisting of unsubstituted imidazole, 1-methylimidazole, 2-methylimidazole, 2-ethyl-4-methylimidazole and 2-phenylimidazole.

7. The composition of claim 4 wherein the polyepoxide is a polyglycidyl ether of p,p'-dihydroxydiphenylpropane and the imidazole is 1-methylimidazole.

8. The composition of claim 4 wherein a siliceous filler or fibrous reinforcement is added.

9. A process for forming a cured plastic composition which comprises:
  (a) forming a liquid mixture through either dissolution or eutectic formation between a monoimidazole and a polyol selected from the group consisting of N,N'-dihydroxyethyl 5,5-dimethyl hydantoin and trimethylpentanediol;
  (b) blending the resulting liquid with a liquid polyepoxide; and
  (c) curing the resulting blend.

10. The process of claim 9 wherein the polyol is dissolved in the monoimidazole, and the monoimidazole is 1-methylimidazole.

11. The process of claim 9 wherein a liquid eutectic is formed and the monoimidazole is selected from the group consisting of unsubstituted imidazole, 2-methylimidazole, 2-phenylimidazole, and 2-ethyl-4-methylimidazole.

* * * * *